United States Patent [19]

Vernon et al.

[11] Patent Number: 4,790,585
[45] Date of Patent: Dec. 13, 1988

[54] DOUBLE DUTY WEEDER

[76] Inventors: James J. Vernon, c/o George Spector, 3615 Woolworth Bldg., 233 Broadway; George Spector, 3615 Woolworth Bldg. 233 Broadway, both of New York, N.Y. 10007

[21] Appl. No.: 534,698

[22] Filed: Sep. 22, 1983

[51] Int. Cl.$^4$ ............................................. F41C 27/04
[52] U.S. Cl. .................................. 294/51; 56/400.04; 172/373
[58] Field of Search ................... 294/51, 50, 52, 50.9, 294/55.5, 59, 49; 172/372, 373, 374, 375, 380, 381; 56/400.04, 400.05, 400.06, 400.07

[56] References Cited

U.S. PATENT DOCUMENTS

| 2,884,278 | 4/1959 | Waara | 294/51 |
| 3,242,513 | 3/1966 | Janke | 294/51 |
| 4,212,150 | 7/1980 | Dmochowski | 294/51 |
| 4,441,747 | 4/1984 | Bryington | 294/51 |

Primary Examiner—James B. Marbert

[57] ABSTRACT

A double headed garden tool is provided and consists of an elongated handle, a plurality of different types of attachable garden tools, a bolt and wing nut for attaching one garden tool to one end of the elongated handle and another bolt and wing nut for attaching another garden tool at a 90° angle to the other end of the elongated handle so that when one garden tool is not in use it will be out of the way when the other garden tool is in use.

1 Claim, 1 Drawing Sheet

U.S. Patent   Dec. 13, 1988   4,790,585
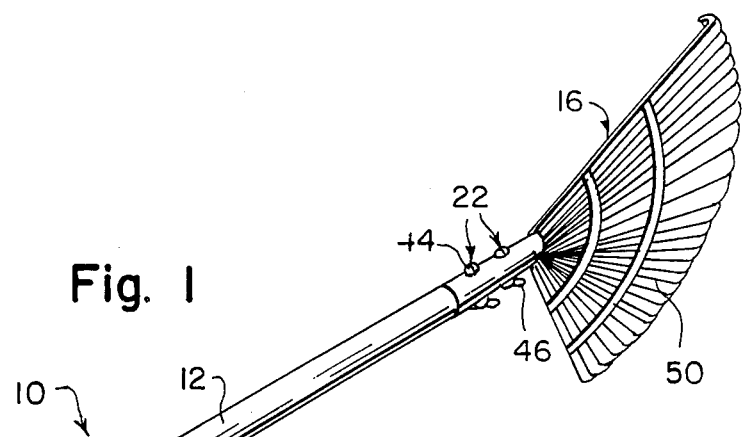
Fig. 1
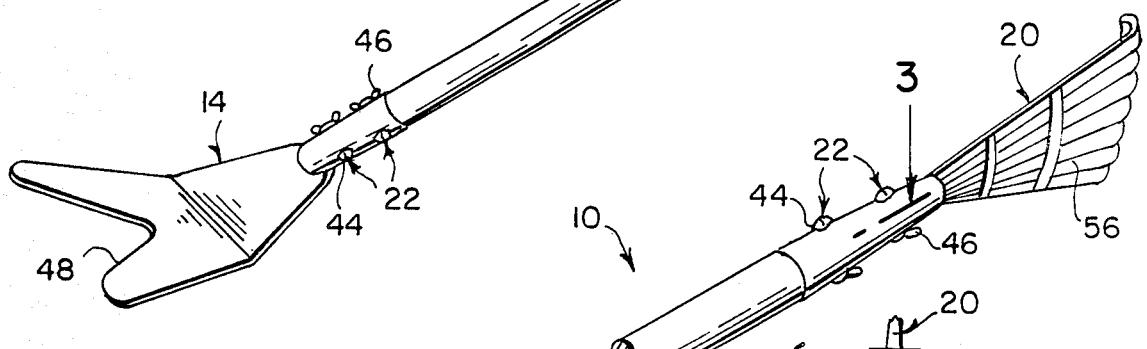
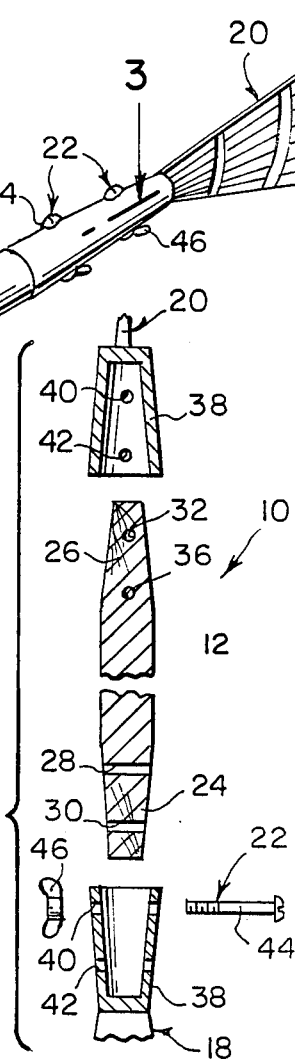
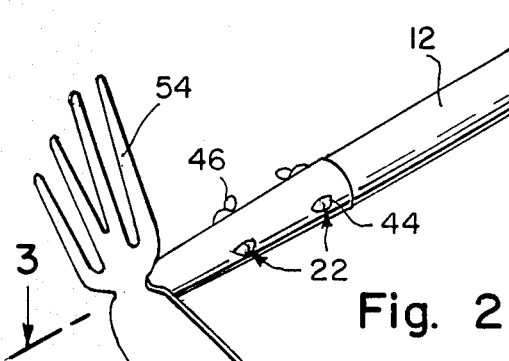
Fig. 2
Fig. 3
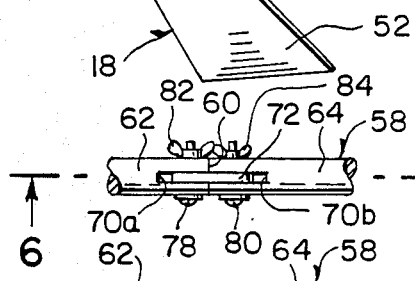
Fig. 4
Fig. 5
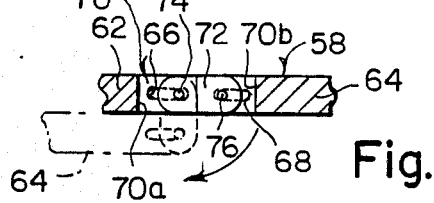
Fig. 6

DOUBLE DUTY WEEDER

BACKGROUND OF THE INVENTION

The instant invention relates generally to garden tools and more specifically it relates to a double headed garden tool.

When a person works in the garden many different types of garden tools must be utilized. Each tool performs a different function. One cuts weeds, another rakes, another hoes, etc. These tools can be costly to purchase and bulky to use and store.

SUMMARY OF THE INVENTION

A principle object of the present invention is to provide a double headed garden tool that has one garden tool at a 90° angle to the other garden tool so that when one garden tool is not in use it will be out of the way when the other garden tool is in use.

Another object is to provide a double headed garden tool that has different types of interchangeable, attachable garden tools.

An additional object is to provide a double headed garden tool that has a collapsible elongated handle so that it can easily be placed in storage.

A further object is to provide a double headed garden tool that has very little to wear out and replace so that it will last for years.

A still further object is to provide a double headed garden tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a partial perspective view of other tools used in the invention.

FIG. 3 is an exploded cross sectional view taken along line 3—3 in FIG. 2.

FIG. 4 is a partial top view showing a portion of a modified handle that collapses for storage.

FIG. 5 is a front view of the handle in FIG. 4.

FIG. 6 is a cross sectional view taken along line 6—6 in FIG. 4.

DETAILED DESCRIPTION OF THE PREFERRED EMBODIMENTS

Turning now descriptively to the drawings, in which similar reference characters denote similar elements throughout the several views, FIGS. 1 through 3 illustrates a double headed garden tool 10. The tool 10 consists of an elongated handle 12, four different types of attachable garden tools 14, 16, 18 and 20 and a means 22 for attaching the garden tools 14, 16, 18 and 20 to the elongated handle 12.

As best seen in FIG. 3 the elongated handle 12 has tapered ends 24 and 26, one tapered end 24 has a pair of transverse apertues 28 and 30 therethrough while the other tapered end 26 has a pair of transverse apertures 32 and 34 therethrough at a 90° angle with the transverse aperture 28 and 30.

Each of the garden tools 14, 16, 18 and 20 has affixed at its end a tapered sleeve 38 having a pair of transverse apertures 40 and 42 therethrough that will line up with the transverse apertures at either end of the elongated handle 12.

The means 22 consists of a pair of bolts 44 and wing nuts 46. Each bolt 44 is placed through one of the transverse apertures 40 and 42 in the tapered sleeve 38 and one of the transverse apertures 28 and 30 in the tapered end 24 or one of the transverse apertures 32 and 36 in the tapered end 26 of the elongated handle 12. Each wing nut 46 is threaded onto an end of each bolt 44 so that each garden tool 14, 16, 18 and 20 is secured to the handle 12.

In FIG. 1 the garden tool 14 is a weed cutter 48 and is at a 90° angle to the garden tool 16 that is a rake 50. In FIG. 2 the garden tool 18 is a small hoe 52 with fork 54 and is at a 90° angle to the garden tool 20 that is a small rake 56. When one garden tool is not in use it will be out of the way when the other garden tool is in use.

FIGS. 4, 5 and 6 show the elongated handle 12 as a collapsible handle 58. Handle 58 is split at 60 and is made in two half handles 62 and 64. Half handle 62 has a slot 66 while half handle 64 has a slot 68. Half handle 62 also has a transverse half slot 70a while half handle 64 has a transverse half slot 70b that line up with transverse half slot 70a to form transverse slot 70 (see FIG. 4). A link member 72 is placed into the transverse slot 70. The link member 72 has a pair of apertures 74 and 76. Aperture 74 lines up with slot 66 while aperture 76 lines up with slot 68. A bolt 78 is placed through slot 66 and aperture 74 while a bolt 80 is placed through slot 68 and aperture 76. A wing nut 82 is placed on threaded end of bolt 78 while a wing nut 84 is placed on threaded end of bolt 80. To collapse the handle 58 the wing nuts 82 and 84 are loosened so that half handle 64 can be folded under to half handle 62 as shown in phantom in FIG. 6.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A double headed garden tool which comprises:
   (a) an elongated handle with transverse apertures at right angles to each other at opposite ends of said handle;
   (b) a plurality of different types of attachable garden tools, and
   (c) means for attaching one garden tool to one end of the elongated handle and another garden tool at a 90° angle to the other end of the elongated handle so that when one garden tool is not in use it will be out of the way when the other garden tool is in use, wherein each of the garden tools has affixed at its end a tapered sleeve having a transverse aperture therethrough that will line up with said transverse aperture at either end of the elongated handle, wherein the means for attaching one garden tool to one end of the elongated handle and another garden tool at a 90° angle to the other end of the elongated handle comprises:

(a) a pair of bolts, each bolt placed through the transverse aperture in the tapered sleeve and the transverse aperture in the tapered end of the elongated handle; and
(b) a pair of wing nuts, each wing nut threaded onto an end of each bolt so that each garden tool is secured to the handle, wherein the elongated handle includes pivotally secured portions which are moveable from an extended coaxial position to a collapsed position with said portions adjacent and parallel.

* * * * *